Nov. 10, 1964 M. M. HILL ETAL 3,156,622
APPARATUS FOR HEATING IONS IN A PLASMA
Filed July 17, 1961 5 Sheets-Sheet 1

INVENTORS.
MILTON M. HILL
DONALD F. MARTIN
BY
Roland A. Anderson
ATTORNEY.

Nov. 10, 1964  M. M. HILL ETAL  3,156,622
APPARATUS FOR HEATING IONS IN A PLASMA
Filed July 17, 1961  5 Sheets-Sheet 2

INVENTORS.
MILTON M. HILL
DONALD F. MARTIN
BY
ATTORNEY.

INVENTORS.
MILTON M. HILL
DONALD F. MARTIN

BY Roland G. Gunderson

ATTORNEY.

Nov. 10, 1964  M. M. HILL ETAL  3,156,622
APPARATUS FOR HEATING IONS IN A PLASMA
Filed July 17, 1961  5 Sheets-Sheet 4

INVENTORS.
MILTON M. HILL
DONALD F. MARTIN
BY
Roland F. Anderson
ATTORNEY.

FIG. 10.

INVENTORS.
MILTON M. HILL
DONALD F. MARTIN
BY
Roland A. Anderson
ATTORNEY.

United States Patent Office 3,156,622
Patented Nov. 10, 1964

3,156,622
APPARATUS FOR HEATING IONS IN A PLASMA
Milton M. Hill, Livermore, and Donald F. Martin, Alamo, Calif., assignors to the United States of America as represented by the United States Atomic Energy Commission
Filed July 17, 1961, Ser. No. 127,084
26 Claims. (Cl. 176—7)

The present invention relates generally to the heating of materials in the gaseous state and, more particularly, to apparatus for heating ions in a plasma to extremely high temperatures.

This application is a continuation-in-part of our copending application, Serial No. 730,757, filed April 22, 1958, and now abandoned in favor of the present application.

Various apparatus are well-known for raising materials in the gaseous state to extremely high temperatures or energies. These high temperatures are valuable for the initiation of various nuclear and chemical reactions between the gaseous constituents, which would not otherwise occur at low temperatures, as well as for thermonuclear purposes. This arises as regards chemical reactions since, as is generally accepted, the speed of reaction approximately doubles for each rise in temperature of 10° C. The production of very high temperatures in gaseous materials is also utilized in high-temperature spectroscopy, which can be an extremely valuable tool, both in basic research and in the control of industrial processes. The energetic particles obtained in the raising of gaseous material to extremely high temperatures, may also be widely employed for injection into various particle accelerators, or other charged particle utilization apparatus. Several devices of this type for intitiating and maintaining high-temperature plasmas are the subjects of United States Letters Patent No. 2,920,236 to Chamber et al., and U.S. Patent No. 2,728,877 to Fischer.

One other specific device having generally similar utility, is that disclosed in a copending application of Richard F. Post, Serial No. 443,447, and which is universally known as a "Pyrotron." A Pyrotron utilizes to great advantage an axially symmetric magnetic field, having spaced gradientially intensified nodal or reflector field regions situated therein, defining a containment zone for radially and axially confining a plasma therein. The magnetic containment field is then appropriately manipulated as by increasing the overall intensity thereof, favoring a sharper increase in the reflector field regions and/or correlatively by causing such reflector field regions to move proximally along the axis of the zone. The plasma confined within the containment zone experiences corresponding magnetic forces which produce both radial and axial compression of the plasma with an attendant adiabatic heating of the plasma particles, and the forcing of the ions into a severely limited region. In this way, a plasma may be created which has a very high temperature or energy, and finds utility in the various ways pointed out supra.

Inasmuch as the adiabatic heating imparted to the plasma particles from the magnetic field is in part related to the increase in field intensity, the ultimate obtainable increase in the temperature of the particles by adiabatic heating is restricted in practice by various material and design limitations in presently available magnetic field producing apparatus. For instance, the amount of electrical energy which may be practically stored in present-day capacitor banks, or equivalent very high-energy storage means for generating a time rising magnetic field while being substantial, is nevertheless limiting upon the maximum obtainable field intensity. Moreover, as the amount of energy applied to the field-producing windings is increased to tremendous proportions, the attendant mechanical and electrical stress established within the windings, pose serious structural and insulation problems.

It is therefore apparent that the greater the energy state of a plasma prior to the adiabatic heating by the magnetic field, the greater will be the energy of the plasma in its final state. The present invention provides methods and apparatus whereby a plasma is created at a low energy, introduced to the central region of an axially symmetric magnetic field, and at the same time heated non-adiabatically, and then adiabatically heated from its non-adiabatically preheated state in the manner set out above, to an ultimate energy significantly higher than that attained without pre-heating.

More particularly, the process of the present invention is conducted in a vacuum; i.e., a region from which extraneous neutral gaseous materials are evacuated to a sufficient degree to permit acceleration of charged particles and/or to prevent interference with the progress of the heating. Firstly, provision is made for the containment of charged particles within such evacuated region by establishing therein, an axially symmetric magnetic field, including axially spaced gradientially intensified reflector or nodal field regions bounding a less intense central field region, said magnetic field rising in time and being radially inhomogeneous in at least the central field region during the initial rate of rise of the field, and then becoming radially homogeneous.

Secondly, provision is made for estabilshing an equatorial ring of ionized plasma, encircling the magnetic field at a medium plane therethrough between the reflector field regions during the inhomogeneous portion of the field rise. The apparatus utilized in establishing the equatorial ring of plasma, gives forth the low-energy plasma mentioned supra. Substantially equal numbers of positive ions and electrons are stripped from the plasma ring, and are accelerated spirally inward by virtue of the inhomogeneous field configuration to the central axial regions of the magnetic field, to be therein confined between the reflector field regions. In this connection, it may be noted that considerable energy can be imparted to the injected particles by selecting a radial field inhomogeneity, such that the plasma particles make many revolutions at large radius while spiraling inward. The particles thus encircle a substantial portion of the total enclosed magnetic flux, resulting in a relatively large increase in the energy or kinetic temperature of the particles, thus providing a "preheated" plasma confined in the central axial regions of the field. The preheated plasma may then be further raised in temperature by adiabatic compression processes of the types described in the hereinbefore referenced Pyrotron application.

The invention also provides apparatus in which the process of the invention may be conducted, such apparatus comprising, in general, means for establishing an evacuated region, means for providing the indicated magnetic field within the evacuated region, means to supply the electrical energizing currents for the said magnetic means, said magnetizing means and/or electrical energization means, comprehending further means for correlating magnetic field intensities as required by hereinafter disclosed operational schemes, and means for establishing a ring of low-energy plasma encircling the magnetic field at the median plane thereof. Accessory apparatus for introducing the preheated plasma to various additional means which may be employed to further increase the energy of the plasma, are also provided.

Accordingly, it is an object of the present invention to provide process and apparatus for producing a heated plasma.

Another object of the present invention is the provision of a novel plasma source for producing a ring of plasma in accordance with the process of the invention.

An important object of this invention contemplates the heating of gaseous material by a non-adiabatic process followed by an adiabatic process.

Still another object of the present invention provides a process and apparatus for injecting and trapping a heated plasma in a Pyrotron.

A further object of the invention is to provide processes and apparatus wherein an equatorial ring of relatively cool plasma is introduced circumferentially to a radially inhomogeneous time-rising magnetic field, and the plasma particles are spiraled radially inward with an attendant gain in energy resulting in the accumulation of a relatively hot plasma in the central axial region of the field.

Other objects and advantages of the present invention will become apparent by the consideration of the following description taken in conjunction with the accompanying drawings, of which:

FIGURE 1, portion (A), is a graphical illustration of the spatial distribution of the radially inhomogeneous magnetic injection field provided in accordance with the invention, and portion (B) is a graphical illustration of a typical axial magnetic field intensity profile for a given radius of the field with (B) disposed in corresponding position beneath portion (A);

Magnetic fields having a variety of configurations are conventionally employed as non-material plasma confining media. Notable among the foregoing, is the magnetic containment field or configuration of the Pyrotron class of plasma heating device as described in the hereinbefore referenced copending patent application. A Pyrotron magnetic containment field, as employed in the ensuing description, is defined as an axially symmetric, radially homogeneous magnetic field having axially spaced gradientially intensified nodal or reflector field regions situated therein. A plasma introduced to the confinement field is confined for long periods of time in the less intense central field region disposed between the terminal reflector field regions, the individual plasma particles traversing helical paths centered about lines of magnetic flux and reflected axially back and forth between the reflector field regions.

In Pyrotrons, as well as most other known plasma energization or heating devices, a relatively "cool" plasma (e.g., a plasma wherein the ions are initially at several volts energy) is generally introduced to the magnetic containment field and trapped therein, for example, in a Pyrotron containment field, as by causing the field intensity to increase with time during injection. The energy of the confined plasma is then increased to obtain temperatures of the order of 10–100 kev. for plasma particle densities of the order of $10^{15}$ particles/cc., by various "adiabatic magnetic heating" processes, the heated plasma being then utilized for any of the uses described supra. It is important to note that "adiabatic magnetic heating" is to be taken herein as referring to any process whereby the energy of a charged particle is increased by interaction with a magnetic field, while the helical orbit of the particle encloses a constant amount of magnetic flux, regardless of the particle position with respect to spatial and time variations of the field. More particularly, with reference to Pyrotron containment fields, continued increase of the field intensity subsequent to injection of plasma and/or correlatively with movement of the reflector field regions, proximally result in adiabatic heating of the plasma, since the magnetic field lines are radially homogeneous. It may be shown, both mathematically and experimentally, that such an adiabatic mode of magnetic heating can be expressed in terms of the ratio of the final energy, $E_f$, to the initial energy, $E_i$, by the following equation:

$$\frac{E_f}{E_i} = \frac{H_f}{H_i}$$

where $H_f$ is the final value of magnetic field intensity and $H_i$ is the initial value thereof.

Figure 1A:
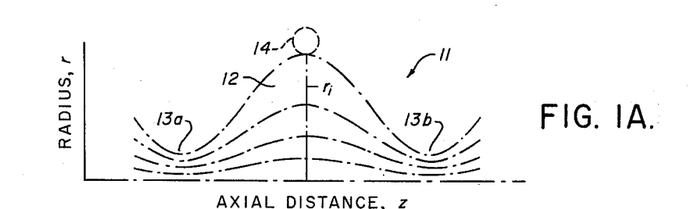
Figure 1B:
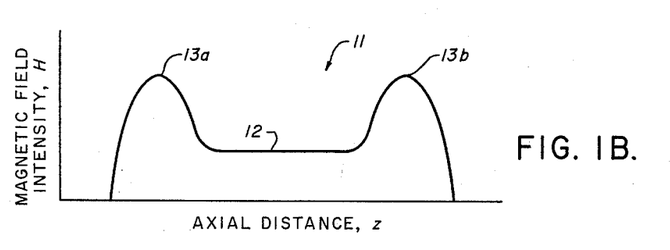
Figure 2:
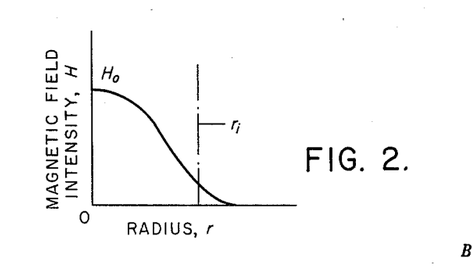
FIGURE 2 is a graphical illustration of radial magnetic intensity profile of the injection field of FIGURE 1.

Considering now the process of the present invention in some detail, and with particular reference to Pyrotrons, a magnetic confinement field is provided, in accordance with the invention, which may have an initial intensity configuration as illustrated in FIGURE 1 of the accompanying drawing. It is to be noted that such confinement field 11 is preferably provided by any suitable means in such a manner that the field intensity patterns in radial planes about an axis are generally symmetrical, i.e., in such a manner that the field intensities are substantially axially symmetric. Moreover, the field is provided with a relatively elongated central region 12 along which the magnetic field intensity at any given radius, $r$, is approximately axially uniform and which merges smoothly with gradientially increased terminal magnetic intensity, reflector field regions 13. It is particularly important to note that the magnetic field of central region 12 is initially radially inhomogeneous, i.e., the radial spacing between magnetic flux lines increases rapidly with increasing radius. More particularly, the radial magnetic intensity profile of central field region 12 is generally as shown in FIGURE 2. The illustrated radial variation of the field may be approximately specified by the equation:

$$H = H_0 \cos br$$

where $H_0$ is the axial field intensity at zero radius, and $b$ is a variable dependent upon the spatial dimensions of the field.

Figure 3:
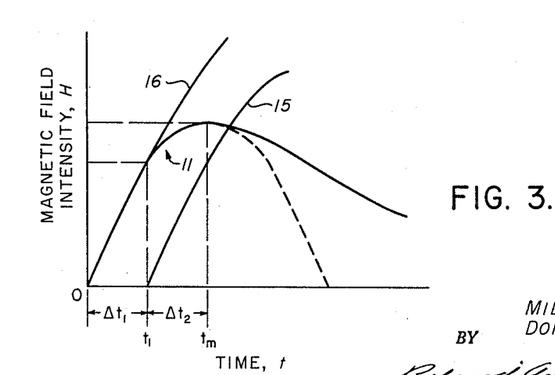
FIGURE 3 is a graph of the axial magnetic field intensity variation with respect to time for the magnetic field of FIGURE 1.

The overall magnetic containment field intensity is, in addition, rising sinusoidally with time as illustrated in FIGURE 3, and therefore the axial magnetic intensity, $H_z$, in central region 12 with respect to radius and time is to close approximation specified by the equation:

$$H_z = H_0 \cos br \sin \omega t$$

Figure 4:
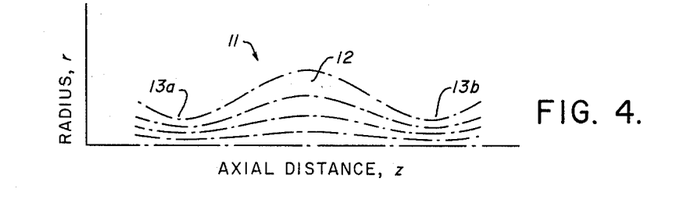
FIGURE 4 is a graphical illustration of the spatial distribution of the magnetic injection field of FIGURE 1 after a time increment $\Delta t_1$, as illustrated in FIGURE 3.

During the substantially linear portion of the sinusoidal variation of time rising field which exists for an increment of time $\Delta t_1$ between zero time and a time $t_1$, the radial field distribution remains inhomogeneous, but the degree of inhomogeneity decreases until after time $t_1$, the distribution becomes homogeneous during a second interval $\Delta t_2$. Such homogeneous distribution is illustrated in FIGURE 4 and as shown therein, the central field region 12 after the time $t_1$ is radially homogeneous and is accordingly of a configuration common employed in Pyrotrons.

The foregoing magnetic confinement field may be provided by various equivalent means, e.g., by means of a pair of coaxially spaced solenoids simultaneously energized by a charged capacitor bank or other suitable electrical energy storage means. The reflector field regions would consequently be concentrically enclosed within the solenoids with the central field region coaxially interposed therebetween.

With the foregoing magnetic confinement field provided having an initially radially inhomogeneous central field region 12, there is next established an annular ring 14 of plasma (i.e., ionized gas having as many positive as negative charges which is substantially equipotential or force-free) encircling central field region 12 at the median plane thereof at a radius $r_1$ (see FIGURES 1A and 2). More particularly, radius $r_1$ of plasma ring 14 is chosen such that the total amount of magnetic flux, $\phi$, enclosed by the ring is nearly equal to or less than $2\pi r_1^2 H_0$, i.e., $$r_i \geq \sqrt{\frac{\phi}{2\pi H_0}}$$

and is thereby chosen to satisfy the well-known Betatron flux condition. In addition, it may be demonstrated mathematically that radius, $r_i$, corresponds to a maximum in the slope of the magnetic vector potential, $A_\theta$, with respect to radius, i.e., $$\frac{\partial A_\theta}{\partial r} = 0$$

Charged particles within the plasma ring are accordingly magnetically extracted from the plasma ring as a result of the combined action of the electric field, $\overline{E}_\theta$, resulting from magnetic induction due to the time rising magnetic field, and instantaneous value $\overline{H}_r$ of magnetic field at the position of the particle. The extraction force vector $\overline{F}$ may be defined as:

$$\overline{F} = \left(\frac{e}{c}\right) \overline{v} \times \overline{H}_r + \left(\frac{e}{c}\right) \overline{E}_\theta$$

where:

$e$ is the charge of any given particle.
$c$ is the velocity of light.
$\overline{v}$ is the velocity vector of the given particle.
$\overline{H}_r$ is the instantaneous magnetic field intensity vector at any given position of the particle.
$\overline{E}_\theta$ is the electric field vector due to magnetic induction.

Such extraction force, $\overline{F}$, is the well-known Lorentz force, wherein the magnetic force component, $$\left(\frac{e}{c}\right) \overline{v} \times \overline{H}_r$$

is directed radially, and the electric force component $$\left(\frac{e}{c}\right) \overline{E}_\theta$$

is directed azimuthally. The magnetic force component is directed radially inward for substantially all particles, and overbalances the azimuthal electric force component. The resultant force, $\overline{F}$, is accordingly effective in accelerating the particles spirally inward with approximately equal numbers of ions and electrons being extracted from the plasma ring and accelerated in mutually opposite azimuthal directions toward the central axis regions of central field region 12. The radial inhomogeneity of the magnetic field is preferably selected such that the particles make a number of revolutions at a large radius. The particles thus encircle a relatively large amount of the total enclosed flux resulting in a relatively large non-adiabatic increase in particle energy. It may be shown that the ratio of the final energy $E_f$ to initial energy $E_i$ due to the foregoing non-adiabatic heating is given by:

$$\frac{E_f}{E_i} = \left(\frac{H_f}{H_i}\right)^m$$

where:

$H_f$ is the final value of the magnetic field,
$H_i$ is the initial value of the magnetic field,
$m$ is an exponent greater than 1 and is a function of the rise time of the field, and the field inhomogeneity, and initial position of the particle in the field.

The amount of energy or heating imparted to particles by the non-adiabatic heating process of the present invention described above, is thus greater than the energy gain attainable by conventional Pyrotron adiabatic heating processes conducted under comparable condition by an exponential factor, $m-1$.

Subsequent to the foregoing non-adiabatic heating of the particles to relatively high kinetic temperatures during the time increment, $\Delta t_1$, additional energy may be imparted to the energetic plasma particles by various adiabatic processes of the character disclosed in the hereinbefore referenced Pyrotron application. Such adiabatic processes may be conducted as by permitting same to occur in situ in the homogeneous magnetic field configuration of field 11 shown in FIGURE 4 which is established during homogeneous interval $\Delta t_2$, after the time interval, $\Delta t_1$, between the time, $t_1$, and a time, $t_m$, corresponding to the maximum value of the sinusoidal time variation of the field (see FIGURE 3). Alternatively, the foregoing non-adiabatic heating process may be accomplished with the magnetic injection field 11 thereof, established symmetrically within the reflector field producing windings of a supplemental conventional Pyrotron. Subsequent to the non-adiabatic heating time interval, $\Delta t_1$, a conventional homogeneous time rising magnetic containment field 15 is established in the region of field 11, as by energizing the Pyrotron reflector field windings. The intensity of such field 15, as illustrated in FIGURE 3, rises sinusoidally with time in the typical Pyrotron manner to a maximum intensity substantially greater than the maximum intensity of field 11. Field 15 accordingly combines with the now homogeneous field 11 to thereby produce a resultant homogeneous time-rising Pyrotron containment field 16 over the time interval $\Delta t_2$ during which adiabatic heating processes are effected in the conventional manner disclosed in the previously referenced Pyrotron application. The relatively energetic plasma obtained by the non-adiabatic heating process of the present invention, and thus injected into a conventional supplemental Pyrotron during time interval $\Delta t_1$, may accordingly be further increased in energy adiabatically during time interval $\Delta t_2$ by interaction with the resultant Pyrotron field 16. It is particularly important to note that inasmuch as the injected plasma is initially of relatively high energy by virtue of the non-adiabatic heating, additional heating by adiabatic means will result in a plasma at extremely high temperatures, and therefore of increased utility. Also, the maximum intensity of the Pyrotron containment field 15, as combined with field 11 to produce resultant field 16 necessary in accomplishing the foregoing, is relatively small and well within the capabilities of known magnetic field generating apparatus.

An energetic plasma may also be injected axially into a Pyrotron magnetic containment field geometry by first establishing the energetic plasma non-adiabatically, as hereinbefore described, in the central field region 12 of injection field 11. Field 11 is established in coaxial alignment with a Pyrotron magnetic containment field and subsequent to time interval $\Delta t_1$, one reflector field region 13 and the adjacent reflector field region of the Pyrotron field are simultaneously decreased in intensity, whereby the energetic plasma preferentially diffuses axially into the central region of the Pyrotron field. Alternatively, the Pyrotron containment field may be initially established without one reflector field region, thus eliminating the requirement of decreasing a reflector field region during introduction of fuel to the containment field. In either case, the decreased reflector field region of the Pyrotron field or unformed reflector field is thence increased to contain the energetic plasma therein, and further heating of the plasma may be conventionally effected by appropriate manipulation of the Pyrotron containment field.

Figure 5:
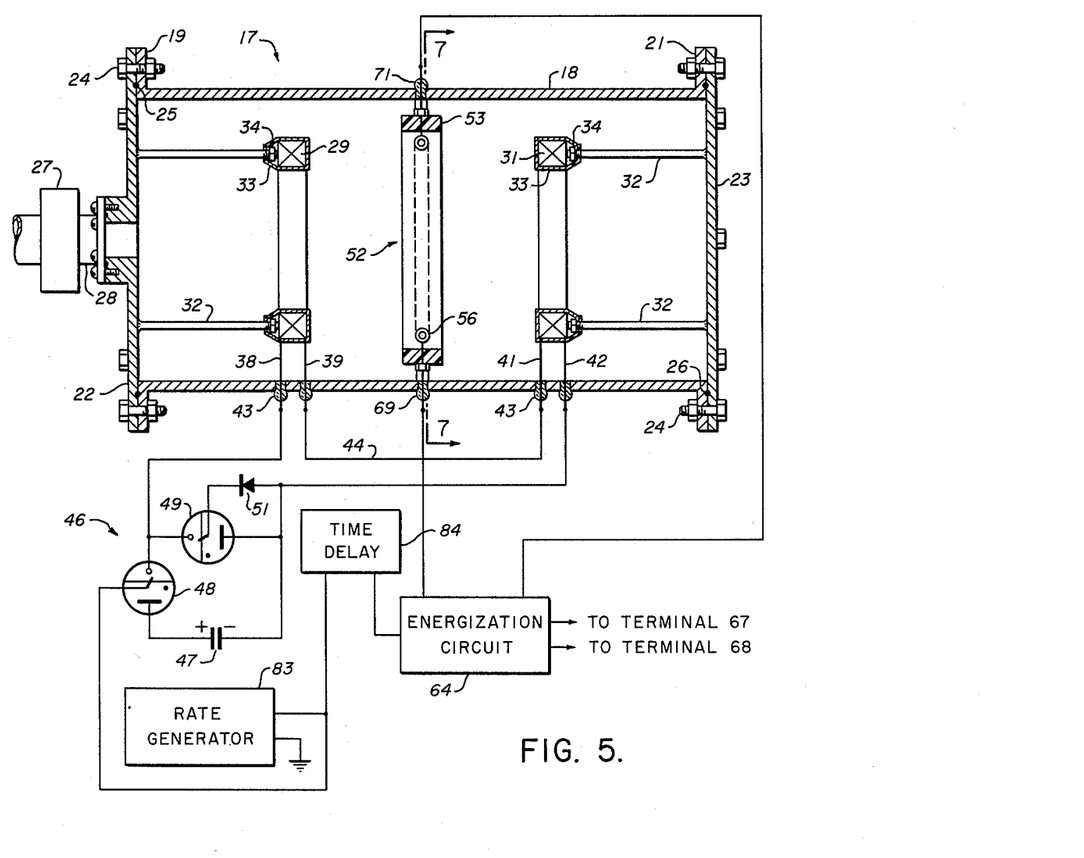
FIGURE 5 is a semi-schematic, cross-sectional view of a preferred embodiment of an injector for conducting injection process in accordance with the invention.

There is consequently produced by the above process, a plasma of high energy or kinetic temperature. The energetic plasma may be advantageously injected into various existing plasma heating devices, particularly Pyrotrons, by the several processes previously described, as well as by various other processes which will be apparent to those skilled in the nuclear art. Various structural arrangements may be employed to carry out the described processes, and this connection, there is illustrated in FIGURE 5 of the drawing a preferred embodiment of the injector of the present invention which may be employed in several different ways subsequently described for injecting energetic plasma into a plasma heating device. As shown in the drawing, the injector generally comprises means establishing an evacuated zone, means for providing within said zone an axially symmetric time-rising magnetic field having longitudinally-spaced, gradientially-intensified magnetic reflector field regions terminally bounding a less intense radially inhomogeneous central field region, means for supplying the electrical energizing currents for said magnetizing means, said magnetizing means and/or electrical energization means comprehending further means for correlating magnetic field intensities as required for injection, and means for establishing an equatorial ring of ionized plasma at the central median plane thereof.

More particularly, said means establishing an evacuated zone may be provided as a vacuum chamber 17, pervious to magnetic fields and which for certain applications described hereinafter may be the vacuum chamber of a Pyrotron.

Chamber 17 is preferably constructed as a hollow, elongated, cylindrical member 18 having outwardly-flanged end extremities 19, 21. Member 18 is best fabricated from a suitable magnetically pervious material compatible with conditions for high-vacuum service, e.g., stainless steel. To facilitate pressure-sealed end closures to the open ends of member 18, closure discs 22, 23 or equivalent means are attached to flanged extremities 19, 21, respectively, as by means of fasteners 24 extending also through interposed annular sealing elements 25, 26.

In order to exhaust vacuum chamber 17 to high-vacuum dimensions, vacuum pump and cold trap means 27 of conventional design are preferably provided in communication with the interior regions of the now closed member 18, as by means of a conduit 28 coupled therebetween.

Means for establishing the axially-symmetric magnetic field within the evacuated chamber 17 may comprise a pair of axially-spaced solenoids 29, 31 disposed coaxially within the chamber, said solenoids being characterized by very large ratios of diameter to axial length. It is to be noted further that solenoids 29, 31 are spaced radially inward from the interior wall surface of member 18 by a substantial amount. Therefore, mounting of solenoids 29, 31 is best facilitated axially by means of rigid spacer studs 32 attached to the interior surfaces of closure disc 22, 23 and projecting longitudinally into the interior of the chamber. Circumferentially-spaced straps 33 encircling the solenoids and attached to studs 32 as by means of spacer nuts 34, threadably engaging same to thereby provide a means for supporting solenoids 29, 31 which affords adjustment of the axial spacing therebetween. Such axial spacing may be thus adjusted as desired to establish an optimum configuration of the magnetic field. In this connection, the axial spacing between solenoids should be such as to establish initially upon energization, the central field region 12 of FIGURE 1 with optimum radial inhomogeneity, the outermost shell of field lines diverging radially outward to member 18. The above-indicated field configuration may also be generated as by means of a single, appropriately-shaped solenoid wherein the turns density of the windings is suitably varied over the length of the solenoid to produce the desired inhomogeneous field configuration.

Figure 6:
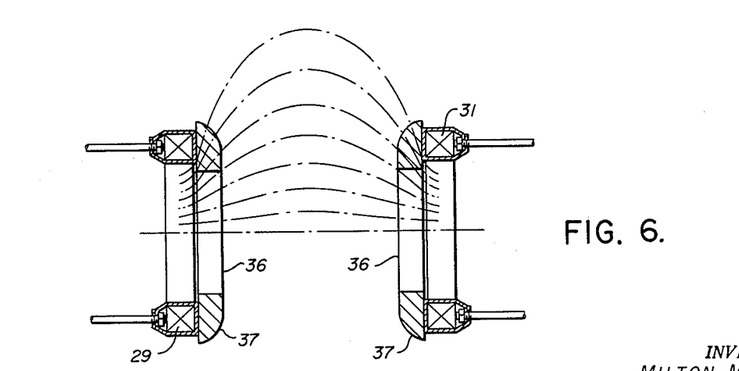
FIGURE 6 illustrates preferred means for optimizing the radial inhomogeneity of the magnetic injection field produced by the embodiment of FIGURE 5.

It will be appreciated that a very nearly ideal inhomogeneous magnetic field configuration may be established by employing suitable pole pieces 36 in conjunction with solenoids 29, 31, as shown in FIGURE 6, to appropriately shape the field. More specifically, pole pieces 36 are preferably annular and are mounted in coaxial juxtaposition with the solenoids at the opposing transverse faces thereof. The opposing faces 37 of such pole pieces 36 are appropriately shaped, for example, oppositely beveled in a radially outward direction, to render the magnetic field line distribution therebetween radially inhomogeneous to substantially any extent desired. Various magnetic materials, e.g., powdered iron, transformer steel, and the like, may be utilized in the construction of pole pieces 36. Since the pole pieces are subject to power losses due to circulating currents therein, radial laminations are implied in the construction thereof to minimize the losses. It is to be noted that with a suitable magnetic material (notably powdered iron) employed in the construction of pole pieces 36, the configuration of the magnetic field generated upon energization of solenoids 29, 31 is principally determined by the pole pieces until the magnetic material thereof saturates, at which time the field configuration becomes substantially identical to that produced by the solenoids alone. The radial inhomogeneity of the field configuration may therefore be rapidly decreased to homogeneity by pulsing solenoids 29, 31 with high-current pulses having fast rise times relative to the initial rate of current rise therein, whereby the magnetic material of pole pieces 36 rapidly saturates and the field configuration abruptly changes. Such an effect may be advantageously employed in a manner which is subsequently described in regard to various modifications of the present invention.

Considering now the means for supplying energizing currents to solenoids 29, 31 in order to establish the magnetic injection field 11, paired lead-in conductors 38, 39 and 41, 42 to solenoids 29 and 31, respectively, are preferably provided to facilitate energization of same. Conductors 38, 39 and 41, 42 are led exteriorly through member 18 as by means of insulator feed through bushings 43 hermetically mounted in the walls thereof. The conductors then terminate at the bushings in conventional high-voltage terminals. Conductors 39, 41 may be interconnected, e.g., by means of a bus bar 44, and the remaining conductors 38, 42 connected to a suitable power source 46 to facilitate energization of solenoids 29, 31 in additive series.

Power source 46 must be capable of delivering large amounts of electrical energy in the form of high-voltage, high-peak currents to solenoids, 29, 31 in a short period of time. Moreover, as previously mentioned the magnetic field established by solenoids 29, 31 is rising sinusoidally in time, i.e., a sinusoidal current variation is indicated. Accordingly, power source 46 will usually, for convenience, be of large electrical or electromechanical energy storage capability while being capable of comprising an oscillatory circuit with solenoids 29, 31. Power source 46 is thus preferably a charged capacitor bank 47 which is precharged by an auxiliary D.C. power supply (not shown), although large rotary devices such as synchronous condensers are also suitable. Such source is best connected to the solenoids through suitable switching means, e.g., a series ignitron 48, to facilitate controlled establishment of the magnetic field. Power source 46 may be also include means for electrically "crowbarring" or short-circuiting solenoids 29, 31 upon the attainment of maximum current therein to prevent current reversals in the oscillatory circuit. Such means preferably comprises at least one ignitron 49 having its cathode connected to the positively charged side of capacitor bank 47 through series ignitron 48 and its anode connected to the negatively charged side thereof. The igniter of ignitron 49 is connected to the cathode of diode 51 of the anode of which is paired with the anode of the ignitron. Accordingly, upon triggering of ignitron 48 by means hereinafter described, charged capacitor bank 47 discharges sinusoidally through solenoids 29, 31 in additive series to thereby establish an injection field 11 rising sinusoidally with time. The period of the sinusoidal oscillations is determined by the inductance of solenoids 29, 31 and capacitance of bank 47. After a quarter-cycle of such sinusoidal current variation, the current, and therefore field 11, attain maximum intensities and begin to decrease in intensity. Simultaneously, the sinusoidal voltage variation across the capacitor bank 47, since it leads the current variation by 90 electrical degrees, passes through zero and reverses in polarity. Accordingly, the anodes of ignitron 49 and diode 51, respectively, become positive with respect to the cathodes thereof. Diode 51 is thus rendered conducting through the igniter and cathode of ignitron 49 to thereby trigger same. Solenoids 29, 31 are consequently short-circuited through the ignitron at maximum current, whereby the current and field 11 thereafter decay exponentially with time according to the time constant of the solenoids.

Considering now the previously-mentioned means for establishing an equatorial ring of ionized plasma at the central median plane of the magnetic field established by solenoids 29, 31, it is to be noted that such means are preferably provided as a novel ring plasma source 52. The source is best disposed circumjacent the bore surface of member 18 at the transverse median plane thereof. Source 52 is preferably constructed as shown in detail in FIGURE 7, wherein there is provided an electrically insulated annular backing member 53 which is advantageously fabricated from a plastic insulating material such as Lucite. Member 53 is adapted for rigid attachment to the interior wall surfaces of member 18, as by means of fasteners 54.

Figure 7:
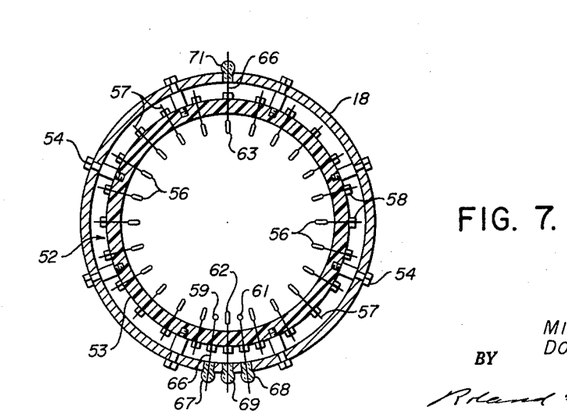
FIGURE 7 is a cross-sectional view taken along the line 7—7 of FIGURE 5, illustrating the structural details of the novel ring plasma source as employed in the present invention.

A plurality of electrically-conducting gaseous fuel emitters are spaced about the interior circumference of member 53, and such emitters are preferably provided as titanium rings 56, each having a radially-projecting, threaded stem 57 to facilitate attachment to member 53 as by means of nuts 58. Rings 56 are loaded with a suitable gaseous material, e.g., deuterium or tritium, which material is evolved from the rings upon the establishment of an arc discharge therebetween. To facilitate controlled initiation of the arc discharge, suitable triggering means are provided proximate the gas emitters which means preferably include trigger electrodes 59, 61 disposed within the gaps between rings on either side of a ring 62 which is hereinafter referred to as the first ring.

Electrically, source 52 is divided into two equal sections with the first ring 62 and a last ring 63, in diametric opposition thereto, being common to both sections. The foregoing will become apparent upon consideration of the plasma source energization circuit 64, which is subsequently described. To facilitate connection of source 52 to energization circuit 64, lead-in conductors 66 are connected to trigger electrodes 59, 61 and first and last rings 62, 63, respectively, and are led exteriorly through pressure-sealed, insulated feed-through bushings 67, 68, 69, 71, respectively, to terminate thereat in conventional input terminals.

Figure 8:
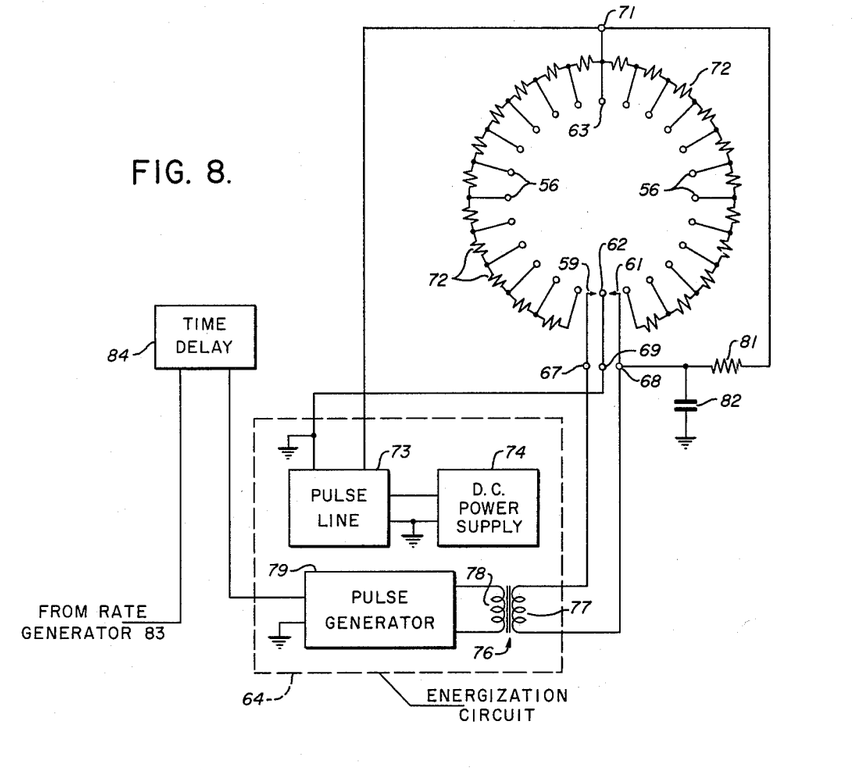
FIGURE 8 is a schematic diagram of a preferred circuit for energizing the ring plasma source.

As regards the details of energization circuit 64 which is illustrated in FIGURE 8, it is to be first noted that all rings 56 disposed circumferentially between the two rings adjacent first ring 62 are connected in electrical series through equal voltage dropping resistors 72 which may be advantageously connected between the stems 57 of adjacent pairs of rings. Resistors 72 comprise a load for a pulse line 73 which is connected between first and last ring input terminals 69, 71, respectively, the former one of which is additionally connected to ground. Line 73 is charged as by means of a high voltage D.C. power supply 74 connected in energizing relationship to the input thereof. Upon initiation of conduction between first ring 62 and the immediately adjacent ones of rings 56 by means hereinafter described, a discharge path is completed to ground. Pulse line 73 accordingly discharges from ring to ring around the annulus of source 52 bifurcately between first and last rings 62, 63, respectively.

Preferred means for establishing conduction between first ring 62 and adjacent ones of rings 56 comprises a pulse transformer 76 having its secondary winding 77 connected between trigger electrode terminals 67, 68, and its primary winding 78 coupled to the output of a triggered pulse generator 79. One electrode terminal 68 is additionally coupled by means of a series resistor 81 and shunt capacitor 82 connected to ground, to last ring terminal 71. Capacitor 82 is accordingly charged through resistor 81 by pulse line 73 connected to terminal 71. Upon the generation of a pulse from pulse generator 79, a high-voltage pulse is correspondingly applied to trigger electrodes 59, 61. The resulting potentials between trigger electrodes 59, 61 and first ring 62 connected to ground are of sufficient magnitudes to establish an arc discharge therebetween. Capacitor 82 is thus discharged through a conduction path including electrode 68 and first ring 62 with sufficient energy being generated to effect evolution of a substantial quantity of gas from ring 62 as well as the adjacent ones of rings 56. The gas is rapidly ionized in the arc discharge resulting in the establishment of a gaseous electrical discharge between ring 62 and adjacent rings 56 and attendant production of plasma. Moreover, the discharge completes a conduction path to ground through which pulse line 73 discharges. Gas evolved from rings 56 adjacent first ring 62 establishes low-resistance conduction paths between such rings and the next successively adjacent rings through which pulse line 73 preferentially discharges. The ionized gaseous discharge thus rapidly progresses in a like manner around source 52 in both directions between first and last rings 62, 63, respectively, to thereby establish an equatorial ring of ionized plasma within vacuum chamber 17. The generation of plasma will persist for a time interval which is substantially determined by the duration of the output pulse from pulse line 73. Accordingly, the plasma generation interval may be adjusted to correlate with any particular rise time of magnetic field 11 employed in the injector, by appropriate design of the pulse line. In order to facilitate the utmost in flexibility, pulse line 73 is advantageously selected to be one wherein the output pulse duration is variable over a wide range.

In order that solenoids 29, 31 and plasma source 52 be energized synchronously for the purposes of the present invention, a rate generator 83, e.g., a multivibrator, is connected in triggering relationship to the igniter of ignitron 48 of solenoid energization circuit 46. Rate generator 83 is also coupled through a suitable time delay 84 to the input of triggered pulse generator 79 of source energization circuit 64. Thus, each rate pulse generated by rate generator 83 triggers ignitron 48 to thereby energize solenoids 29, 31 and establish magnetic field 11. After a short time delay introduced by time-delay means 84 to ensure prior establishment of magnetic field 11, the rate pulse triggers pulse generator 79, resulting in the generation of a ring of ionized plasma from source 52. The further operation of the injector of the present invention follows from the hereinbefore described processes thereof. The plasma particles, viz, ions and electrons, are generated from source 52 with relatively low energies, e.g., several electron volts. As magnetic field 11 rises sinusoidally in time during a quarter cycle of the current oscillation in solenoids 29, 31, the plasma ions and electrons are spiraled radially inward toward the axis of vacuum chamber 17 during the initial time interval $\Delta t_1$, of previous mention, after which plasma generation is terminated due to the corresponding predetermined discharge period of pulse line 73. During such time interval, $\Delta t_1$, the energies of the relatively low-energy plasma ions and electrons are materially increased non-adiabatically in the manner previously described, thus resulting in an accumulation of high-energy plasma in the central axial region of vacuum chamber 17 defined axially by reflector field regions 13a and 13b of field 11.

Subsequent to non-adiabatic time interval $\Delta t_1$, the injected high-energy plasma gains additional energy by conventional, adiabatic compression according to the several alternative methods previously described. Firstly, the injected high-energy plasma may be heated adiabatically in situ by magnetic field 11 during time interval $\Delta t_2$ (see FIGURE 3) extending from the end of interval $\Delta t_1$ to the end of a quarter-cycle of the magnetic field current variation. The time-rising field during interval $\Delta t_2$ is homogeneous, and accordingly of conventional Pyrotron configuration whereby the adiabatic heating occurs as described in the previously referenced Pyrotron application. In a sufficiently large device, the combined non-adiabatic and adiabatic heating may be sufficient to raise the energy of the plasma to thermonuclear reaction ignition temperature and establish a thermonuclear reaction. Such reactions result in a tremendous exothermic release of energy, and the production of extremely energetic charged particles. The reaction energy may be converted to usable power by any one of several now well-known methods and means. For example, at the end of a quarter-cycle of the sinusoidal variation of magnetic field 11 at which time the field attains maximum intensity, solenoids 29, 31 are automatically short-circuited by diode 51 and ignitron 49 as hereinbefore described. Magnetic field 11 then tends to decay exponentially in time. The extremely energetic particles produced by the reaction interact with the field 11, however, and deliver their energy to the field by inductive coupling. The additional energy of the charged particles, as well as the energy employed in generating the field, accordingly appears in the form of usable electrical energy across input terminals 38, 42 to solenoids 29, 31. Such solenoids thus in effect comprise an electrical generator to which electrical energy utilizing equipment may be conveniently connected.

Figure 9:
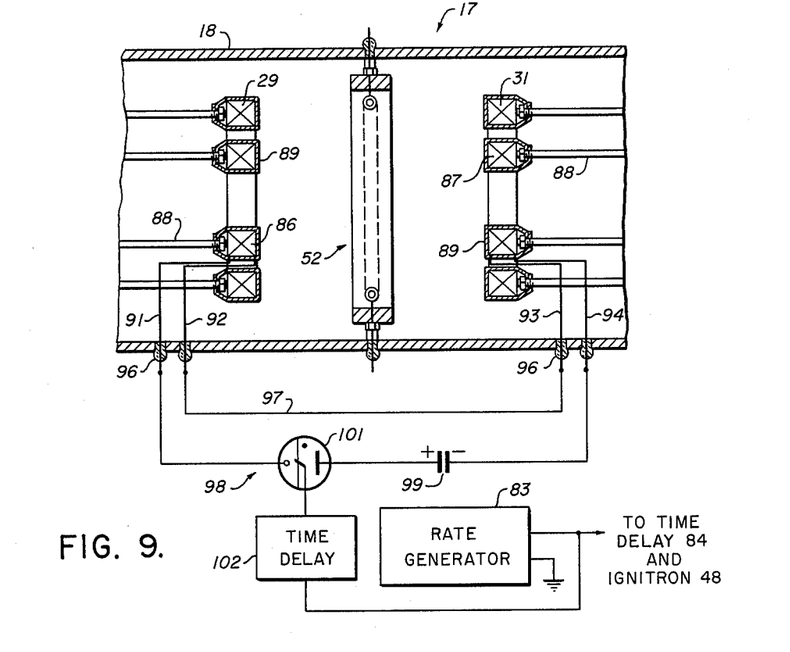
FIGURE 9 is a semi-schematic, cross-sectional view of a preferred embodiment of the injector as employed for injecting energetic plasma into a supplemental Pyrotron having its magnetic containment field established in super-imposition with the injection field.

Secondly, the adiabatic heating portions of the process of the present invention may be conducted in a supplemental Pyrotron containment field in either superimposition or axial alignment with the injector field 11. In the event the former method is employed, the Pyrotron magnetic containment field is preferably established as illustrated in FIGURE 9. As shown therein, a pair of containment field solenoids 86, 87 are disposed in coaxial-spaced relationship within vacuum chamber 17 of the injector of the present invention. Such solenoids, in combination with energizing means hereinafter described in effect, comprise a Pyrotron of the general character disclosed in the previously referenced application for a basic Pyrotron. It is to be noted that Pyrotron solenoids 86, 87, for the purposes of the present invention, are radially spaced from the interior wall surfaces of vacuum chamber member 18 by a substantial distance to facilitate concentric circumscription of such solenoids by injector solenoids 29, 31, respectively.

More specifically, Pyrotron solenoids 86, 87 may be supported concentrically within injector solenoids 29, 31, respectively, as by means of spacer studs 88 projecting axially inward from the interior faces of closure discs 22, 23. Studs 88 are secured to circumferentially-spaced straps 89, encircling the solenoids in a manner similar to that previously described with respect to solenoids 29, 31.

Pyrotron solenoids 86, 87 may be connected to any suitable electrical energizing means to produce a time-rising Pyrotron containment field, i.e., an axially symmetric radially homogeneous magnetic field having axially-spaced gradientially-intensified reflector field regions situated therein, axially of vacuum chamber 17 in superimposition with injector field 11. To facilitate the foregoing, paired lead-in conductors 91, 92, and 93, 94 are connected to the end terminations of solenoids 86, 87, respectively. Such conductors 91, 92 and 93, 94 are led exteriorly through member 18 as by means of insulator feedthrough bushings 96, hermetically mounted in the walls thereof to terminate at such bushings in conventional high-voltage terminals.

Solenoids 86, 87 are connected in additive series, preferably by means of a bus bar 97 connected between terminals 92 and 93 with terminals 91, 94 coupled through switching means to a suitable power source 98. Power source 98 is conventionally provided as a capacitor bank 99, precharged to high voltage by a power supply (not shown) and connected to terminals 91, 94 through a series switch ignitron 101. Terminal 94 is directly connected to the negative side of capacitor bank 99, while the positive side thereof is connected to the anode of ignitron 101, the cathode of which is connected to terminal 91. Suitable short-circuiting means, as well as other magnetic field manipulating means which are not herein described, may be additionally coupled to solenoids 86, 87 as required to conduct various Pyrotron processes in accordance with the prior art.

The generation of the Pyrotron containment field may be programmed with respect to the generation of the injection field 11 and injection of plasma as by means of suitable time-delay means 102 connected between the igniter of ignitron 101 and rate generator 83. Time-delay means 102 is preferably selected to have a delay time equal to the interval $\Delta t_1$ of previous mention, during which injector field 11 is radially inhomogeneous. Accordingly, each rate pulse generated by generator 83 effects establishment of injection field 11 and injection of plasma from source 52 to the central axial regions of vacuum chamber 17 in the manner hereinbefore described. After the interval $\Delta t_1$ introduced by time delay 102, the rate pulse triggers ignitron 101 to cause capacitor bank 99 to discharge sinusoidally through solenoids 86, 87, thus establishing the time-rising Pyrotron containment field 15 of previous mention axially of chamber 17. The establishment of such field consequently coincides with the time, $t_1$, where injector field 11 becomes radially homogeneous and injection of plasma in accordance with the present invention is terminated. The Pyrotron field and injector field then produces the resultant homogeneous Pyrotron containment field 16 subsequent to time, $t_1$, which continues to rise in time after time, $t_2$, corresponding to the maximum value of injector field 11. The injected energetic plasma is thus further energized adiabatically within such resultant homogeneous field, as set forth in relation to the process of the present invention.

Figure 10:
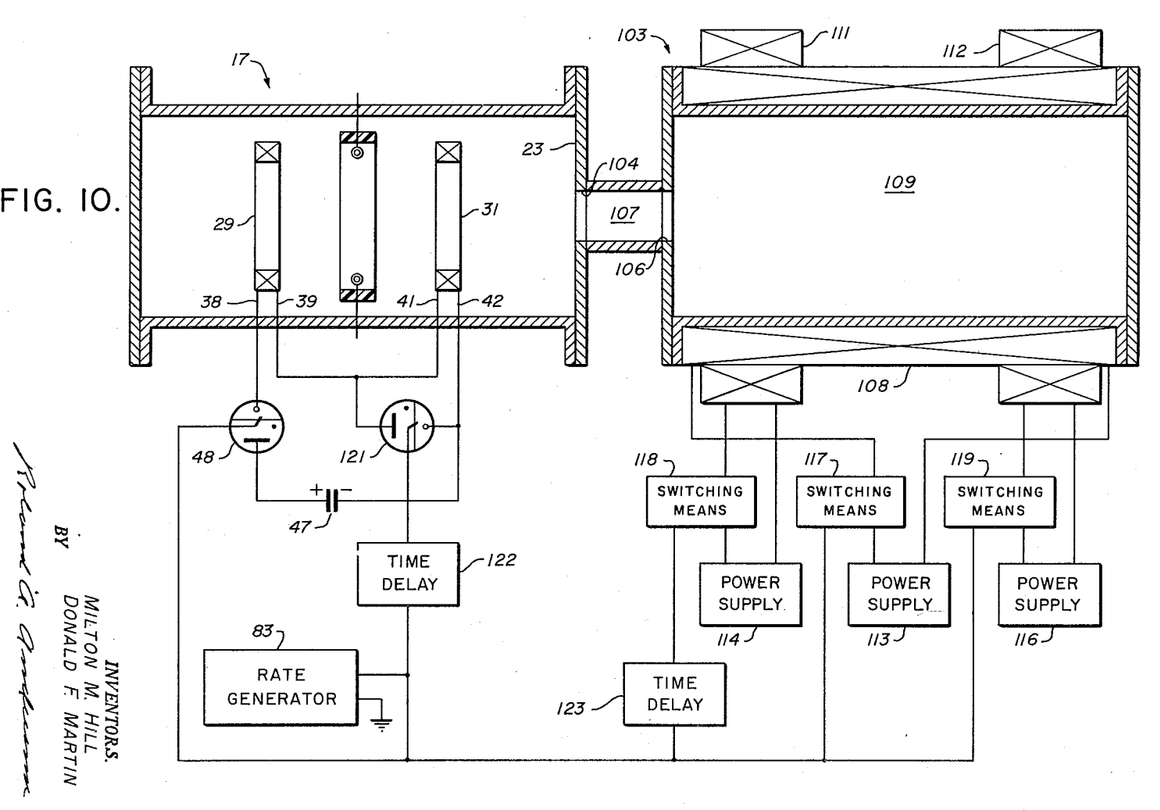
FIGURE 10 is a semi-schematic, cross-sectional view of a preferred embodiment of the injector as employed for injecting energetic plasma axially into a supplemental Pyrotron.

In the event it is desired to employ the injector for axial injection into a supplemental Pyrotron 103, the injector is disposed in axial alignment therewith as illustrated in FIGURE 10. It is to be noted that for the foregoing purpose, the injector is modified to include a central axial aperture 104 in closure disc 23 to permit passage of energetic plasma axially therethrough. Pyrotron 103 includes a similar axial aperture 106 in the proximal end thereof and such apertures 104, 106 are communicably coupled as by means of a magnetically pervious conduit 107, hermetically secured to the injector and Pyrotron.

It will be appreciated that Pyrotron 103 may include any one of various magnetic containment field generating means, several of which are disclosed in detail in the previously referenced Pyrotron patent application. In the interests of simplicity and clarity, however, Pyrotron 103 is illustrated and described herein as having a central field solenoid 108 disposed coaxially about the vacuum chamber 109 thereof. Axially spaced reflector field solenoids 111, 112 are in turn concentrically disposed about the ends of central field solenoid 108 whereby upon energization such reflector field solenoids produce axially-spaced, gradientially-intensified reflector field regions terminally bounding a less intense central field region as established by solenoid 108. The resulting overall magnetic field accordingly comprises a conventional Pyrotron containment field.

Energization of Pyrotron solenoids 108, 111, 112 is facilitated by suitable power supplies 113, 114, 116, respectively, i.e., charged capacitor banks or the like, coupled to such solenoids through corresponding fast switching means 117, 118, 119, e.g., ignitrons. Said switching means may be individually triggered by pulses applied thereto from any suitable source to thus provide independent energization of solenoids 108, 111, 112, respectively.

Means are provided to short-circuit injector solenoid 31 at time, $t_1$, subsequent to inhomogeneous time interval $\Delta t_1$ during which energetic fuel plasma is accumulated in the central axial region of injector field 11. Such short-circuiting means may comprise, for example, an ignitron 121 having its cathode connected to terminal 42, and its anode connected to terminal 41. The igniter of ignitron 121 is coupled to rate generator 83 through time-delay means 122 having a delay time substantially equal to $\Delta t_1$. Thus, ignitron 121 is triggered at time $t_1$ to thereby short-circuit solenoid 31, whereby the proximal reflector field region 13b produced by same decays exponentially in time, while the distal reflector field region 13a produced by solenoid 29 continues to increase in time. Accordingly, the energetic plasma accumulated within the central axial regions of field 11 preferentially diffuses axially through the least intense one of reflector field regions 13, and therefore through aperture 104 and conduit 107 into Pyrotron 103.

To facilitate trapping of the energetic plasma within Pyrotron 103, the energization of solenoids 108, 111, 112 is suitably programmed with respect to the operation of the injector. For example, switching means 117, 119 may be connected directly to rate generator 83, and switching means 118 coupled thereto through a time delay 123 for producing a delay time suitably greater than $\Delta t_1$. Therefore, solenoids 108, 112 are energized simultaneously with injector solenoids 29, 31, while solenoid 111 is energized subsequent to the short-circuiting of solenoid 31, preferably, after substantially all of the plasma has diffused into Pyrotron 103. Moreover, the circuit constants of solenoids 108, 111, 112 and corresponding power supplies may be selected relative to injector solenoids 29, 31 and associated circuitry, such that the intensity of the central field region produced by solenoid 108 is slightly less than that of injector field 11 during the time reflector field region 13b decays in intensity. It is also desirable that the intensity of the reflector field region produced by solenoid 112 be equal to that of injector field region 13a at the time reflector field region 13b decreases in intensity. The field generated by solenoids 108, 112 thus combines with the injector field to produce an overall field configuration extending through the injector and Pyrotron which is defined by terminal reflector field closures bounding a less intense central field region. The central field region is divided into a relatively high-intensity region within the injector, and a low-intensity sink region within Pyrotron 103 by decreasing reflector field region 13b. The plasma accordingly tends to diffuse from the injector into the low-intensity sink region of the field within the Pyrotron. After the time interval introduced by time delay 123, switching means 118 is triggered by the original pulse generated by rate generator 83 to thus initiate energization of solenoid 111. Such solenoid may be designed to produce a reflector field having an extremely fast rate of rise, whereby such reflector fields attain an intensity substantially equal to that produced by solenoid 112 in a sufficiently short time to contain the energetic plasma within the central field region of the containment field thus established.

While there has been described in the foregoing what may be considered to be preferred embodiments of the invention, modifications may be made therein without departing from the teachings of the invention. For example, the pole pieces 36 by previous mention which may be employed in conjunction with injector solenoids 29, 31 to facilitate the generation of the injection field of the present invention with optimum radial inhomogeneity, may be shaped to produce such an inhomogeneity during the initial rate of rise of the field that charged particles introduced circumferentially to the field, as by means of ring plasma source 52, will remain in a stable orbit at a large radius for a relatively long period of time. In other words, the inhomogeneity prior to saturation of the pole pieces is selected to produce a stable particle orbit in the manner of a conventional Betatron. The particles are accordingly accelerated to high energies in the stable orbit. At any desired time prior to saturation of the pole pieces, the solenoids 29, 31 may then be rapidly pulsed to thereby saturate the pole pieces and destroy the stable orbit configuration of the field. The high-energy particles consequently leave the stable orbit and spiral inwardly to the central axial region of vacuum chamber 17 enclosed by the injection field in the manner hereinbefore described. The foregoing facilitates the accumulation and containment of extremely energetic charged particles or plasma within the injector of the present invention.

The following is a specific example of a working embodiment of the present invention. The example can be most clearly understood when taken with reference to FIGURE 5. Chamber 17 is 48" in length and approximately 18" in diameter, comprised of $\frac{1}{16}$" stainless steel reinforced by $\frac{1}{2}$" of epoxy resin impregnated glass fiber and cloth with the gasket surfaces composed of epoxy resin and glass beads. Coils 29, 31 have 12" I.D. and are separated by a distance of 12" inside of vacuum chamber 17. The coils consist of six turns each of $\frac{3}{8}$" O.D. heavy walled copper tubing and are vacuum potted in an epoxy resin-thiokal plastic without the use of glass fiber or cloth, since the maximum magnetic force is insufficient to require their useage. The maximum magnetic field obtained between the coils in the above configuration is 6,000 gauss with a mirror ratio of 1.5. The coils are supplied by a storage energy source, consisting of twenty 7.5 microfarad, 20 kv., oil-filled capacitors connected electrically in series parallel, which give a maximum of $2 \times 10^4$ joules of energy available. The working base pressure of the vacuum system servicing container 17 is $2 \times 10^{-7}$ mm. Hg read at the cold trap 27, and $4 \times 10^{-7}$ mm. Hg read on a gauge (V.G. 1–A) located in the region between coils 29, 31.

Ring plasma source 53 consists of 100 titanium rings (loaded either with hydrogen or deuterium gas), each ring being $\frac{1}{2}$" in diameter and separated by a distance of $\frac{1}{2}$". These rings are mounted on a Lucite plastic ring 17" I.D. Electrically, the source is connected so that it is divided into two equal sections with a common initial electrode and trigger, and a common final electrode in the manner described hereinbefore. The titanium rings are electrically connected in series (each half) by means of small resistors consisting of .006" stainless steel wire, which serve as a load for a 1 ohm pulse line which is about 10 msec. in electrical length.

The amount of plasma and gas evolved by the source can be varied over a wide range by simply varying the voltage on the source pulse line. With the vacuum system initially at a pressure of $4 \times 10^{-7}$ mm. Hg, typical pressure rises in the vacuum system (as read on the gauge between the coils) range from $5 \times 10^{-6}$ mm. Hg for low voltage (approximately 1 kv.) to $1 \times 10^{-4}$ mm. Hg for high voltage on the source ($\sim$10 kv.).

Use of the specific embodiment set out above, and in the manner prescribed above resulted in the measurement by means of microwave spectroscopy of central electron densities of $2 \times 10^{13}$ electrons/cc., and the maintenance of a measurable electron density for 700 $\mu$sec. The magnetic field rises to a maximum value in 70 $\mu$sec. and has a decay time to the $1/e$ value of 900 $\mu$sec. The ion density at the start of the magnetic cycle, determined by means of intermolecular Stark broadening of the $H_\alpha$ line of the Balmer series of hydrogen is approximately $2 \times 10^{14}$ ions/cc. The rise in plasma energy was from approximately one electron volt to 100 electron volts.

What is claimed is:

1. A plasma energization process comprising the steps of establishing in an evacuated space, a radially inhomogeneous axially symmetric magnetic field having spaced regions of increased magnetic field intensity therein defining a containment zone, establishing a ring of plasma coaxially of said field at a transverse median plane between said regions of increased magnetic field intensity, increasing the magnetic field intensity of said field with respect to time to spiral particles from said ring radially inward to the central axial region of said zone whereby the energy of said particles is increased non-adiabatically and energetic particles are accumulated in said zone, providing a radially homogeneous axially symmetric magnetic field having spaced regions of increased magnetic field intensity therein, and increasing the intensity of said last named field with respect to time to further increase the energy of said energetic particles adiabatically.

2. A process for increasing the energy of electrically charged particles conducted in an evacuated space, comprising the steps of establishing within said evacuated space an axially symmetric magnetic field, $H_z$, increasing the intensity of said magnetic field, with respect to time, $t$, and radius, $r$, as approximately specified by the equation:

$H_z = H_0 \cos br \sin \omega t$, where $H_0$ is the intensity of the field at zero radius, and $b$ is a variable dependent upon the spatial dimensions of the field, and producing a stationary ring of said charged particles coaxially of said magnetic field, $H_z$, at a radius of at least $r_1$, where $r_1$ is related to the field by the equation:

$$r_1 = \sqrt{\frac{\phi}{2H_0}}$$

$\phi$ being the total amount of magnetic flux enclosed by said ring of charged particles, whereby said charged particles are accelerated radially inward by forces generated by said increasing magnetic field intensity to non-adiabatically increase the energy of said particles.

3. A process for providing energetic plasma conducted in an evacuated region comprising the steps of establishing within said evacuated space an axially symmetric radially inhomogeneous magnetic field having spaced gradientially-intensified reflector field regions situated therein, increasing the intensity of said magnetic field sinusoidally with respect to time, changing said magnetic field during an initial time interval $\Delta t_1$ to become radially homogeneous during a subsequent time interval $\Delta t_2$ maintaining said magnetic field radially homogeneous through maximum sinusoidal intensity thereof and producing a stationary ring of plasma during said time interval $\Delta t_1$ at a central transverse median plane intermediate the reflector field regions of said field and at a radial position where the slope of the magnetic vector potential with respect to radius is zero whereby said plasma is non-adiabatically heated and accumulated in the central axial region of said field during the time interval $\Delta t_1$ and is adiabatically heated during the time interval $\Delta t_2$.

4. A method of injecting energetic plasma into the evacuated region of a reactor comprising the steps of establishing within said space an axially symmetric magnetic injection field having axially-spaced gradientially-intensified terminal reflector field closures situated therein defining an injection zone, increasing the intensity of said magnetic field rise sinusoidally with respect to time and being initially radially inhomogeneous and decreasing in inhomogeneity during an initial time interval $\Delta t_1$ to become radially homogeneous thereafter, producing an equatorial ring of plasma within said magnetic field during said time interval $\Delta t_1$ at a transverse median plane intermediate said terminal reflector field closures and at a radial position where the slope of the magnetic vector potential of said field with respect to radius is zero, whereby said plasma is introduced in said injection zone by radially inward accelerating forces generated as said magnetic field increases in intensity with respect to time, establishing a time rising Pyrotron magnetic containment field defining a containment zone within said evacuated space in axial symmetry with respect to said injection zone simultaneously with the termination of said time interval $\Delta t_1$, and decreasing the intensity of said injection field subsequent to the attainment of maximum intensity in the sinusoidal variation thereof.

5. In a method of injecting plasma into a Pyrotron magnetic containment field including terminal reflector field closures and established in an evacuated space to thereby define a magnetic containment zone, the steps comprising establishing a second evacuated space in axial communication with the evacuated space of said reactor, providing within said second space in axial alignment with said Pyrotron magnetic containment field an axially symmetric magnetic injection field having axially-spaced gradientially-intensified reflector field regions situated therein, one of said reflector field regions being thereby axially juxapositioned with one of the reflector field closures of said containment field, increasing the intensity of said magnetic injection field sinusoidally with respect to time being initially radially inhomogeneous and decreasing in inhomogeneity during an initial time interval $\Delta t$, to become radially homogeneous therafter, producing an equatorial ring of plasma at a transverse median plane intermediate the reflector field regions and at a radial position where the slope of the magnetic vector potential with respect to radius is zero, whereby said plasma is introduced in said injection zone by radially inward acceleration from forces generated as said magnetic field increases in intensity with respect to time, decreasing the intensities of the juxtapositioned reflector field region and reflector field closure subsequent to the termination of said interval $\Delta t_1$ to effect diffusion of plasma of elevated kinetic temperatures axially into said magnetic containment zone, rapidly increasing the intensity of the decreased reflector field closure to trap the plasma in said containment zone, and decreasing the intensity of said injection field subsequent to the trapping of plasma in said containment zone.

6. A plasma injector comprising means defining an evacuated enclosure, solenoid means for establishing within said enclosure upon electrical energization an axially symmetric radially inhomogeneous magnetic field having axially-spaced gradientially-intensified reflector field regions situated therein, electrical current source means coupled to said solenoid means for energizing same with a time rising current to establish said magnetic field with the intensity thereof rising in time, and stationary ring plasma generating means communicating with said evacuated zone for producing an equatorial ring of plasma coaxially of said magnetic field and at a transverse median plane intermediate said reflector field regions whereby the energy of the charged particles of said plasma is increased in spiraling inwardly to the central axial region of said field by forces generated as said magnetic field increases in intensity with respect to time to be accumulated therein as a plasma of elevated kinetic temperature.

7. A plasma injector as defined by claim 6 further defined by said solenoid means comprising a pair of solenoids connected in additive series disposed within said evacuated space and coaxially spaced to produce an axially symmetric magnetic field having a radially inhomogeneous central field region situated between said solenoids and gradientially intensified reflector regions situated at the centers of said solenoids to terminally bound the central field region.

8. A plasma injector as defined by claim 6 further defined by said electrical current source means comprising a capacitor bank precharged to high voltage, and switching means connecting said capacitor bank to said magnetic field generating means.

9. A plasma injector as defined by claim 6 further defined by said plasma generating means comprising a plurality of electrically conducting gaseous fuel emitters in circumferentially spaced relationship at the transverse median plane intermediate the reflector field regions of said magnetic field and coaxial therewith, and triggering means disposed proximate said emitters for establishing an arc discharge therebetween to effect evolution of gas therefrom, said gas being ionized by the arc discharge to produce a ring of plasma.

10. In a plasma injector, the combination comprising means defining an evacuated enclosure, a pair of solenoids disposed proximate said enclosure and connected in additive series, said solenoids coaxially spaced to produce upon energization an axially symmetric magnetic field having a radially inhomogeneous central field region situated between said solenoids and terminally bounded by gradientially intensified reflector field regions situated proximate the centers of said solenoids within said enclosure, a capacitor bank including means for precharging to high voltage, switching means connecting said capacitor bank to said solenoids to energize same with time rising sinusoidal current, and a stationary ring plasma source means coaxially disposed intermediate said solenoids for producing an equatorial ring of plasma within said enclosure said plasma source being disposed with respect to said magnetic field at a radial position where the radial derivative of the magnetic vector potential of said field is zero.

11. In a plasma injector as defined by claim 10, the combination further defined by annular pole pieces of magnetic material mounted in coaxial juxtaposition with the opposing transverse faces of said solenoids and having opposing faces shaped to produce optimum radial inhomogeneity in the distribution of the field lines of said magnetic field.

12. In a plasma injector as defined by claim 11, the combination further defined by said ring plasma source comprising a plurality of annularly spaced electrically conducting thermonuclear gaseous fuel emitters, and triggering means disposed proximate said emitters for establishing an arc discharge therebetween for releasing gas therefrom, said gas being ionized in said arc discharge to establish an equatorial ring of plasma.

13. A plasma energizer comprising means for establishing an evacuated zone, a pair of solenoids disposed within said zone and connected in additive series, said solenoids coaxially spaced to produce upon energization an axially symmetric magnetic field having a radially inhomogeneous central field region disposed between said solenoids and terminally bounded by gradientially intensified reflector field regions at the centers of said solenoids, a pair of annular pole pieces of magnetic material respectively mounted in coaxial juxtaposition with the opposing transverse faces of said solenoids and having opposing faces shaped to produce optimum radial inhomogeneity in the distribution of the field lines of said central field region, a capacitor bank precharged to high voltage, switching means for controllably connecting said capacitor bank in energizing relationship with said solenoids, said solenoids being thereby energized with time rising sinusoidal current, a plurality of annularly spaced electrically conducting gas emitters disposed coaxially intermediate said solenoids and at a radial position of at least $r_1$, $r_1$ being defined by the equation:

$$r_i = \sqrt{\frac{\phi}{2\pi H_0}}$$

where $\phi$ is the total amount of flux of said magnetic field enclosed by the annulus of emitters and $H_0$ is the intensity of said field at zero radius, means connected to said emitters for establishing potential gradients between adjacent ones thereof, triggering means disposed proximate said emitters for controllably establishing an arc discharge therebetween to release gas therefrom, said gas being ionized in said arc discharge to establish an equatorial ring of plasma with the ionized charged particles thereof being heated in spiraling inward to the central axial region of said field during the substantially linear portion of the sinusoidal energizing current variation to be accumulated as a heated plasma in said central region.

14. A plasma energizer as defined by claim 13 further defined by said solenoids being characterized by large ratios of diameter to axial length.

15. A plasma energizer as defined by claim 13 but further including a pair of containment field solenoids disposed concentrically within said solenoids respectively, electrical energizing means, second switching means connected between said energizing means and said containment field solenoids for controllably energizing same to establish an axially symmetric radially homogeneous magnetic containment field, and time delay means connected between said first and second switching means to actuate the second one thereof subsequent to said substantially linear portion of sinusoidal energizing current variation.

16. A plasma energizer as defined by claim 13 but wherein said switching means comprises at least one ignitron series connected to said solenoids and said capacitor bank with its anode connected to the positively charged side of said bank and its cathode connected to the solenoids, and said means for short circuiting said solenoids comprises a second ignitron having its anode end connected to the negative side of said capacitor bank and its cathode connected to the cathode of said first ignitron, and a diode having its cathode and anode respectively connected to the igniter and anode of said second ignitron.

17. In a fuel injector for a Pyrotron including at least an evacuated vacuum chamber, a central field solenoid disposed coaxially of the chamber, first and second reflector field solenoids disposed concentrically about the ends of the central field solenoid, and electrical energizing means connected to said central and reflector field solenoids for energizing same to produce an axially symmetric magnetic containment field having axially spaced reflector field closures of increased magnetic intensity situated therein, the combination comprising an evacuated vacuum chamber, conduit means connecting said chamber in axial communication with the vacuum chamber of said Pyrotron, first and second coaxially spaced injector solenoids connected in additive series and disposed in said vacuum chamber with said second injector solenoid in juxtaposition with said first reflector field solenoid, said injector solenoids spaced to produce upon energization an axially symmetric radially inhomogeneous magnetic injection field having axially spaced gradiently intensified reflector field regions situated therein, power supply means coupled to said injector solenoids for applying time rising current thereto to establish said injection field, a ring plasma source disposed within said vacuum chamber at the transverse median plane intermediate said injector solenoids for introducing a ring of plasma to the injection field in coaxial relationship therewith, said plasma being heated and accumulated in the central axial region of the injection field, switching means connected to said second injector solenoid for short circuiting same subsequent to the accumulation of heated plasma in said injection field, programming means connected between said Pyrotron electrical energizing means and said power supply means for correlatively initiating energization of said central field solenoid and said second reflector field solenoid simultaneously with energization of said injector solenoids while initiating delayed energization of said first reflector solenoid subsequent to the short-circuiting of said second injector solenoid to inject and trap heated plasma in said containment field.

18. Apparatus for heating plasma comprising a vacuum chamber, vacuum pump and cold trap means connected to said chamber, first and second solenoids mounted in coaxially spaced relationship within said chamber and connected in additive series, a capacitor bank precharged to high voltage and having its negatively charged side connected to said second solenoid, at least one switching ignitron including anode, cathode and igniter elements, said anode connected to the positively charged side of said capacitor bank, said cathode connected to said first solenoid, a rate generator connected to the igniter of said ignitron for periodically firing same to discharge said capacitor bank through said solenoids, at least one short-circuiting ignitron including anode, cathode, and igniter elements, said short-circuiting ignitron cathode connected to said first solenoid, said short-circuiting ignitron anode connected to said second solenoid, a diode having its anode and cathode respectively connected to the anode and igniter of said short-circuiting ignitron, an annular insulating backing member mounted coaxially intermediate said solenoids and having a diameter greater than the diameter of said solenoids, a plurality of electrically conducting gas emitters loaded with gaseous material and attached in circumferentially spaced relationship to said backing member, a plurality of resistors respectively connected between said emitters in circumferential succession between the two immediately adjacent emitters on opposite sides of a first emitter connected to ground, a pulse line connected between said first emitter and a last emitter in diametric opposition thereto, power supply means connected to said pulse line for charging same to high voltage, triggering means including a pair of trigger electrodes respectively disposed between said first emitter and the immediately adjacent emitters on opposite sides thereof, pulse generating means connected between said trigger electrodes, and time delay means connected between said rate generator and said pulse generating means for actuating the pulse generating means subsequent to the triggering of said switching ignitron.

19. Apparatus as defined by claim 18 further comprising first and second containment field solenoids connected in additive series and mounted concentrically within said first and second solenoid respectively, a second capacitor bank precharged to high voltage and having its negatively charged side connected to said second containment field solenoid, at least one second switching ignitron including anode, cathode, and igniter elements, said anode connected to the positively charged side of said second capacitor bank, said cathode connected to said first containment field solenoid, and time delay means connected between said rate generator and the igniter of said second switching ignitron for triggering same to discharge said second capacitor bank through said first and second containment field solenoids subsequent to the actuation of said pulse generating means.

20. Apparatus as defined by claim 18 further comprising a second vacuum chamber coaxially communicably connected with said first vacuum chamber, a central field solenoid disposed concentrically about said second vacuum chamber, first and second axially spaced reflector field solenoids respectively disposed concentrically about the ends of said central field solenoid, a central field power supply, first switching means connecting said central field power supply in closed series relationship with said central field solenoid, first and second reflector field power supplies, second and third switching means respectively connecting said first and second reflector field power supplies in closed series relationship with said first and second reflector field solenoids, a second short-circuiting ignitron including anode, cathode, and igniter elements, said cathode connected to the negatively charged side of said capacitor bank, said anode connected to said second solenoid to thereby place the second short-circuiting ignitron in parallel with the second solenoid, conductor means connecting said rate generator directly to said first and third switching means to actuate same simultaneously with the triggering of said switching ignitron, second time delay means connected between said rate generator and the igniter of said second short-circuiting ignitron for triggering same subsequent to the discharge of said pulse line, and third time delay means connected between said rate generator and said second switching means for actuating same subsequent to the triggering of said second short-circuiting ignitron.

21. A ring plasma source comprising an annular insulating backing member, a plurality of electrically conducting gas emitters loaded with gaseous material and attached in circumferentially spaced relationship to said backing member to project radially inward therefrom, a plurality of resistors respectively connected between said emitters in circumferential succession between the two immediately adjacent emitters on opposite sides of a first emitter connected to ground, a pulse line connected between said first emitter and a last emitter in diametric opposition thereto, power supply means connected in charging relationship to said pulse line, a pair of trigger electrodes respectively disposed between said first emitter and the immediately adjacent emitters on opposite sides of said first emitter, a storage capacitor connected between one of said trigger electrodes and ground, a charging resistor connected between said last emitter and said capacitor, a pulse generator, and a pulse transformer having its primary winding connected to said pulse generator and its secondary winding connected between said trigger electrodes.

22. A plasma source as defined by claim 21 wherein said gas emitters comprise rings oriented transverse to the circumference of said backing member and fabricated from titanium loaded with gaseous material.

23. A plasma source as defined by claim 22 wherein said gaseous material is deuterium.

24. A plasma source as defined by claim 22 wherein said gaseous material is tritium.

25. In a process for increasing the energy of electrically charged particles and accumulating same, the steps comprising establishing in an evacuated space a radially inhomogeneous axially symmetric magnetic field having axially-spaced gradientially-intensified reflector field regions situated therein, providing electrically charged particles in a stationary ring encircling said magnetic field at a median plane between said reflector field regions, and increasing the intensity of said field with respect to time whereby the energy of said particles is increased and said particles are caused to spiral radially inward by the forces resulting as said magnetic field increases intensity with respect to time, to be accumulated in the central axial region of said field between the reflector field regions thereof.

26. A plasma energization process comprising the steps of establishing in an evacuated space a radially inhomogeneous axially symmetric magnetic field having spaced regions of increased magnetic field intensity therein defining a containment zone for charged particles, establishing a stationary ring of plasma coaxially of said field at a transverse median plane between said regions of increased magnetic field intensity, radially increasing the intensity of said field with respect to time simultaneously with establishment of said plasma ring, and subsequently changing said initially radially inhomogeneous magnetic field to a radially homogeneous magnetic field.

References Cited in the file of this patent

UNITED STATES PATENTS

| | | |
|---|---|---|
| 2,826,708 | Foster | Mar. 11, 1958 |
| 2,883,580 | Kilpatrick | Apr. 21, 1959 |
| 2,961,559 | Marshall | Nov. 22, 1960 |
| 2,992,345 | Hansen | July 11, 1961 |
| 3,005,931 | Dandl | Oct. 24, 1961 |
| 3,021,272 | Baker et al. | Feb. 13, 1962 |
| 3,030,543 | Luce | Apr. 17, 1962 |
| 3,031,398 | Tuck | Apr. 24, 1962 |
| 3,071,525 | Christofilos | Jan. 1, 1963 |
| 3,120,475 | Bennett | Feb. 4, 1964 |